(12) United States Patent
Chukka

(10) Patent No.: US 10,855,344 B1
(45) Date of Patent: Dec. 1, 2020

(54) REDUCING MASSIVE MULTIPLE-INPUT MULTIPLE-OUTPUT/5G INTERFERENCE WITH AN ADJACENT BAND

(71) Applicant: Sprint Communications Company L.P., Overland Park, KS (US)

(72) Inventor: Chaitanya Chukka, Carol Stream, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/418,049

(22) Filed: May 21, 2019

(51) Int. Cl.
*H04B 7/0426* (2017.01)
*H04B 7/0452* (2017.01)
*H04W 52/24* (2009.01)
*H04B 17/336* (2015.01)
*H04B 7/0456* (2017.01)
*H04B 17/382* (2015.01)

(52) U.S. Cl.
CPC .......... *H04B 7/043* (2013.01); *H04B 7/0452* (2013.01); *H04B 7/0456* (2013.01); *H04B 17/336* (2015.01); *H04B 17/382* (2015.01); *H04W 52/241* (2013.01)

(58) Field of Classification Search
CPC .... H04B 7/043; H04B 17/382; H04B 17/336; H04B 7/0456; H04B 7/0452; H04W 52/241
See application file for complete search history.

(56) References Cited

U.S. PATENT DOCUMENTS

2014/0370823 A1* 12/2014 Yu .......................... H04B 17/14 455/73
2018/0352461 A1* 12/2018 Guirguis .............. H04B 17/336
2019/0393601 A1* 12/2019 Logothetis ........... H04B 1/0475

* cited by examiner

*Primary Examiner* — Vineeta S Panwalkar

(57) ABSTRACT

Systems and methods are provided for reducing massive multiple-input multiple-output (mMIMO)/5G out-of-band-emission. After detecting interference with an adjacent band, the mMIMO unit (MMU) determines the best corrective action based on calculations to determine if the equivalent isotropically radiated power would still lead to emissions in the adjacent band and, if required, apply one or more corrective actions. In one corrective action, the MMU reduces the overall power by turning off certain power amplifiers driving the dipoles. In another corrective action, the MMU changes the antenna beam width automatically to sway away from the target. In yet another corrective action, the MMU alternates the output power control range. In each of the aspects, the analysis is based on distance and boresight azimuth, as well as location factors. In some aspects, a topographic map of the affected area is utilized to determine clutter so that the selected corrective action is most effective.

19 Claims, 5 Drawing Sheets

400

402 — Monitor a signal-to-interference-plus-noise-ratio (SINR) of an antenna in an MMU with respect to a target 404 — Based on the SINR dropping at or below a predetermined threshold, initiate a mitigation component between the antenna and the target

US 10,855,344 B1

REDUCING MASSIVE MULTIPLE-INPUT MULTIPLE-OUTPUT/5G INTERFERENCE WITH AN ADJACENT BAND

SUMMARY

Embodiments of the technology described herein are directed to, among other things, systems and methods for reducing massive multiple-input multiple-output (mMIMO) interference with an adjacent band. To do so, after detecting interference with a nearby protected spectrum, the mMIMO unit (MMU) determines the best corrective action based on calculations to determine if the equivalent isotropically radiated power (EIRP) would still lead to emissions in an adjacent band (i.e., a protected spectrum) of a target (e.g., a source operating in the Next-Generation Radar (NEXRAD) spectrum, military spectrum, or airport spectrum) and, if required, apply one or more corrective actions. In one corrective action, the MMU reduces the overall power by turning off certain power amplifiers driving the dipoles. In another corrective action, the MMU changes the antenna beam width automatically to sway away from the target. In yet another corrective action, the MMU alternates the output power control range.

In each of the aspects, the analysis is based on distance and boresight azimuth, as well as location factors. In some aspects, the base station (e.g., an Evolved Node B or a Next Generation Node B) may utilize a topographic map of the affected area to determine clutter so that the output of the algorithm is more accurate.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
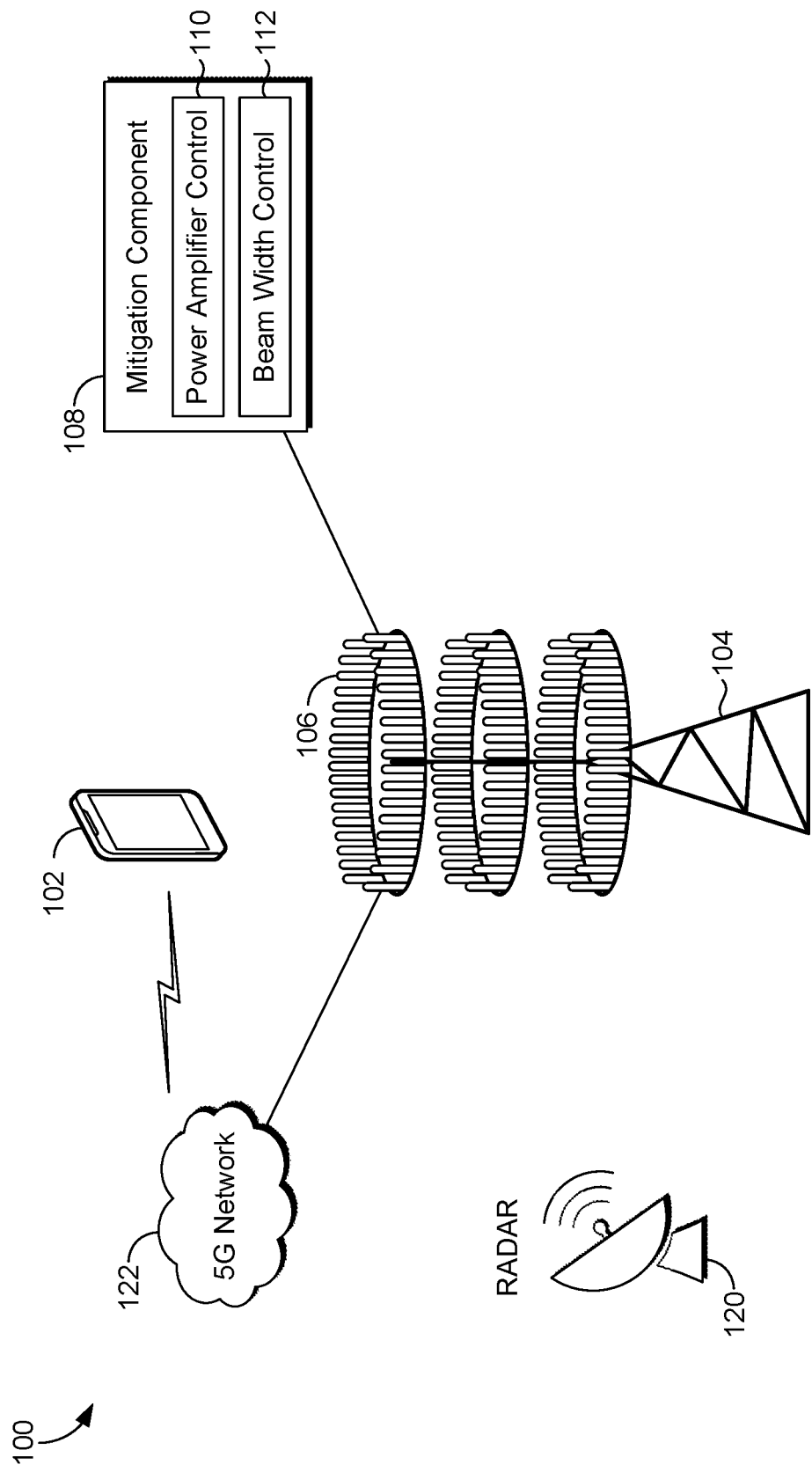
FIG. 1 is a diagram of an example network environment, in accordance with some aspects of the technology described herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
OOBE Out-of-Band-Emission
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, mMIMO/5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

In some MMU deployments, the MMU is deployed in Broadband Radio Service (BRS) band. BRS band shares contingency with some protected spectrums (e.g., NEXRAD spectrum, military spectrum, or airport spectrum). Currently, the integrated Remote Radio Unit (RRU) and antenna dipole in MMU mMIMO/5G deployments prevent external filtering to obviate or reduce possible emissions into the protected spectrums. However, since MMU technology is needed for mMIMO/5G, and the airports are one of the hotspots currently requiring more capacity, minimizing such interference is critical for implementation.

The present disclosure is directed to systems, methods, and computer readable media that reduce mMIMO/5G interference with an adjacent band. To do so, after detecting interference with an adjacent band (e.g., a nearby protected spectrum), the MMU determines the best corrective action based on calculations to determine if the EIRP would still lead to emissions in the adjacent band and, if required, apply one or more corrective actions. In one corrective action, the MMU reduces the overall power by turning off certain power amplifiers driving the dipoles. In another corrective action, the MMU changes the antenna beam width automatically to sway away from the target. In yet another corrective action, the MMU alternates the output power control range.

According to aspects of the technology described herein, a method is provided reducing mMIMO/5G interference with an adjacent band. The method comprises monitoring SINR of an antenna in an MMU with respect to a target. The method further comprises, based on the SINR dropping below a predetermined threshold, initiating a mitigation component between the antenna and the target. According to further aspects of the technology described herein, one or more computer-readable media having computer-executable instructions embodied thereon that, when executed by at least one computing device, cause the computing device to perform operations for reducing mMIMO/5G interference with an adjacent band. The operations comprise monitoring a SINR of an antenna in an MMU with respect to a target. The operations also comprise, based on the SINR dropping below a predetermined threshold, initiating a mitigation component between the antenna and the target. The operations further comprise determining, by the mitigation component, one or more mitigation controls to apply to the antenna. The operations also comprise, based on the determining, applying the one or more mitigation controls to the antenna.

According to even further aspects of the technology described herein, a system is provided for reducing mMIMO/5G interference with an adjacent band. The system comprises a MMU comprising a plurality of antennas that monitors a SINR of an antenna of the plurality of antennas with respect to a target; and a mitigation component that, based on the SINR dropping below a predetermined threshold, is applied between the antenna and the target to determine one or more mitigation controls to apply to the antenna, wherein, based on the determining, the MMU applies the one or more mitigation controls to the antenna, the one or more mitigation controls comprising one or more of: alternating an output power control range of the antenna, turning off a physical dipole of the antenna, modifying a beam width of the antenna.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

As previously mentioned, embodiments of the present invention are directed to reducing mMIMO/5G interference with an adjacent band in a network cell. A network cell may comprise a base station to facilitate wireless communication between a communications device within the network cell, such as communications device 600 described with respect to FIG. 6, and a network. As shown in FIG. 1, a communications device may be a WCD 102. In the network environment 100, WCD 102 may communicate with other devices, such as mobile devices, servers, etc. The WCD 102 may take on a variety of forms, such as a personal computer, a laptop computer, a tablet, a netbook, a mobile phone, a Smart phone, a personal digital assistant, or any other device capable of communicating with outer devices. For example, the WCD 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, WCD 102 comprises a wireless or mobile device with which a wireless telecommunication network(s) can be utilized for communication (e.g., voice and/or data communication). In this regard, the WCD 102 can be any mobile computing device that communicates by way of, for example, a mMIMO/5G network.

The WCD 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as WCD 102. For example, network 122 may provide voice services to user devices or corresponding users that are registered or subscribed to utilize the services (e.g., network 120) provided by a telecommunications provider. Although it is contemplated network 122 can be any communication network providing voice and/or data service(s), such as, for example, a 1x circuit voice, a 3G network (e.g., CDMA, CDMA1000, WCDMA, GSM, UMTS), a 4G network (WiMAX, LTE, HSDPA), or the like, network 122 is depicted in FIG. 1 as a mMIMO/5G network.

The network environment 100 may include a database (not shown). The database may be similar to the memory component 612 in FIG. 6 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the WCD 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between WCD 102 and network 122.

The base station 104 may also include or be associated with an LTE System Manager (LSM) configured to manage a lookup table. The lookup table may include location, azimuth, and height information of targets. In this way, the lookup table may help identify targets and areas of potential interference.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include a mitigation component 108. The mitigation component 108 may be configured to, among other things, reduce mMIMO/5G interference with an adjacent band in accordance with the present disclosure. Though mitigation component 108 is illustrated as a component of base station 104 in FIG. 1, it may be a standalone device (e.g., a server having one or more processors), a service provided via the mMIMO/5G network 122, or may be remotely located.

As mentioned, the mitigation component 108 may facilitate reducing mMIMO/5G interference with an adjacent band for one or more antennas associated with one or more base stations, such as base station 104. The mitigation component 108 may include, among other things, a power amplifier control 110 and a beam width control 112. The mitigation component 108 may receive, among other things, data from user devices, such as WCD 102, within a network cell associated with a particular base station 104. The data received by the mitigation component 108 comprises location information of the user device and network parameters determined at or by the user device that may indicate a realized uplink and/or downlink transmission data rate, observed SINR and/or signal strength at the user device, path loss, or throughput of the connection. Location information may be based on GPS or other satellite location services, terrestrial triangulation, an access point location, or any other means of obtaining coarse or fine location information. The at least one set of data collected may also include signal to noise ratio for one or more transitory signals communicated between the WCD and a communication protocol (e.g. mMIMO/5G wireless network). Location and/or network parameters may take into account the user device capability, such as the number of antennas and the type of receiver used for detection. Additionally, the at least one set of data may also comprise path loss between the WCD and the communication protocol and sector interference in a predetermined geographical region or location.

Based on information received by the mitigation component 108, power amplifier control 110 and/or beam width control 112 may apply controls to the antenna to reduce the OOBE. For example, the mitigation component 108 may monitor the SINR of an antenna of the MMU with respect to a target. A decrease in the SINR below a predetermined threshold may indicate the proximity of the target. Accordingly, if the SINR drops below a predetermined threshold, the MMU may direct the power amplifier control 110 and/or beam width control 112 to perform various actions to increase the SINR to a satisfactory level (i.e., at or above the threshold) and thereby reduce the OOBE.

In one aspect, the MMU performs calculations to determine if the EIRP causes emissions in the adjacent band (i.e., the protected spectrum) and, if required, apply one or more actions. The analysis may be based on distance, boresight azimuth, and location factors. The location of targets can be loaded into the LSM with azimuth and height information of the target via a lookup table. Accordingly, the MMU may process the lookup table and identify areas of potential interference. Additionally or alternatively, a base station of the MMU may have a topographic map of the area to determine clutter (i.e., objects that may reduce line of sight with the target and prevent interference) so the analysis is more accurate. In some aspects, the MMU tracks changes over time and may signal the target (i.e., the WCD) to check for interference and, if still present, apply additional actions. In this way, the MMU may automate the monitoring with respect to the target and may signal the target over the air to determine if the SINR is below the threshold.

Once the MMU has determined the appropriate actions to apply, the MMU may direct the power amplifier control 110 and/or beam width control 112 to apply the actions. For example, the power amplifier control 110 may reduce the overall power by turning off certain power amplifiers driving the dipoles of the antenna. To do so, the power amplifier control 110 may switch off boresight power controls to reduce the overall EIRP, which effectively turns of the dipoles for that particular radiation. In this way, the total output power of the antenna is 160 watts, and each element is responsible for approximately 2.5 watts per path (e.g., four of dipoles), so the power amplifier control may turn down a portion of the paths to reduce the total output power. Since the EIRP is a function of the total output power of the antenna (i.e., the amplifier gain) plus the antenna gain, reducing the total output power of the antenna reduces the overall EIRP, which may, in turn, increase the SINR to an acceptable level.

In another aspect, the power amplifier control 110 may alternate the output power control range. Rather than turning off certain power amplifiers driving the dipoles of the antenna, the power amplifier control 110 may reduce certain power amplifiers to effectively reduce the output power for one or more paths. For example, the power amplifier control 110 may reduce one or more elements to 2, 1.5, 1 watts per path to reduce the overall EIRP so that the SINR increases to an acceptable. As can be appreciated, the power amplifier control 110 may reduce the one or more elements to a level necessary to avoid OOBE with respect to the target.

In yet another aspect, the beam width control 112 may change the antenna beam width to automatically sway away from the target. To do so, the location of the target and the height of the target may initially be considered. Then, utilizing the lookup table described above, the mitigation component 108 may determine that, based on the current azimuth of the antenna, and direct the beam width control 112 to change the degree of the beam width (which also changes the amplitude and energy no longer travels in the direction of the target). In this way, the beam width control 112 changes the actual width of the broadcast beam to avoid the target.

Figure 2:
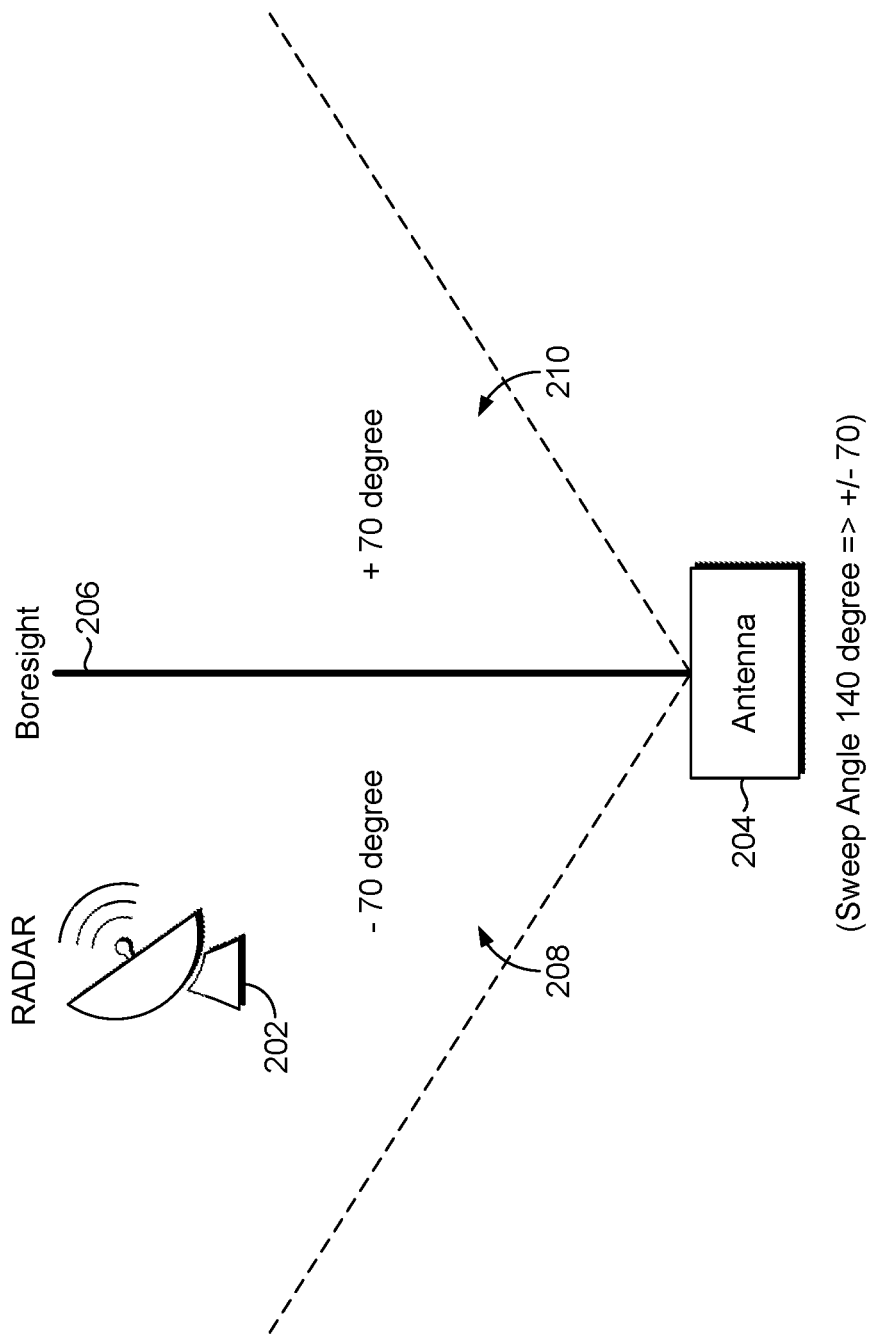
FIG. 2 is a diagram of an example operating environment, in accordance with some aspects of the technology described herein.

For illustrative purposes only, FIG. 2 provides an example of an antenna 204 with a beamwidth 208, 210 (e.g., a sweep angle of 140 degrees) that currently includes a target operating in a protected spectrum (i.e., the radar 202) in the boresight 206 of the antenna. As described above, a mitigation component (e.g., the mitigation component 108 described at or above with respect to FIG. 1) may, based on the SINR dropping below a predetermined threshold, determine one or more mitigation controls to apply to the antenna. For example, the MMU may modify an output power control range of the antenna. Additionally or alternatively, the MMU may turn off a physical dipole of the antenna. Additionally or alternatively, the MMU may modify a beam width of the antenna. In embodiments, the MMU applies one or more of the mitigation control until the SINR increase at or above the predetermined threshold and OOBE no longer reduces the effectiveness of the target. As described herein, the MMU determines the appropriate course of action based on determining if, after applying each of the one or more actions, the EIRP of the antenna would still result in emissions in the protected spectrum.

Figure 3:
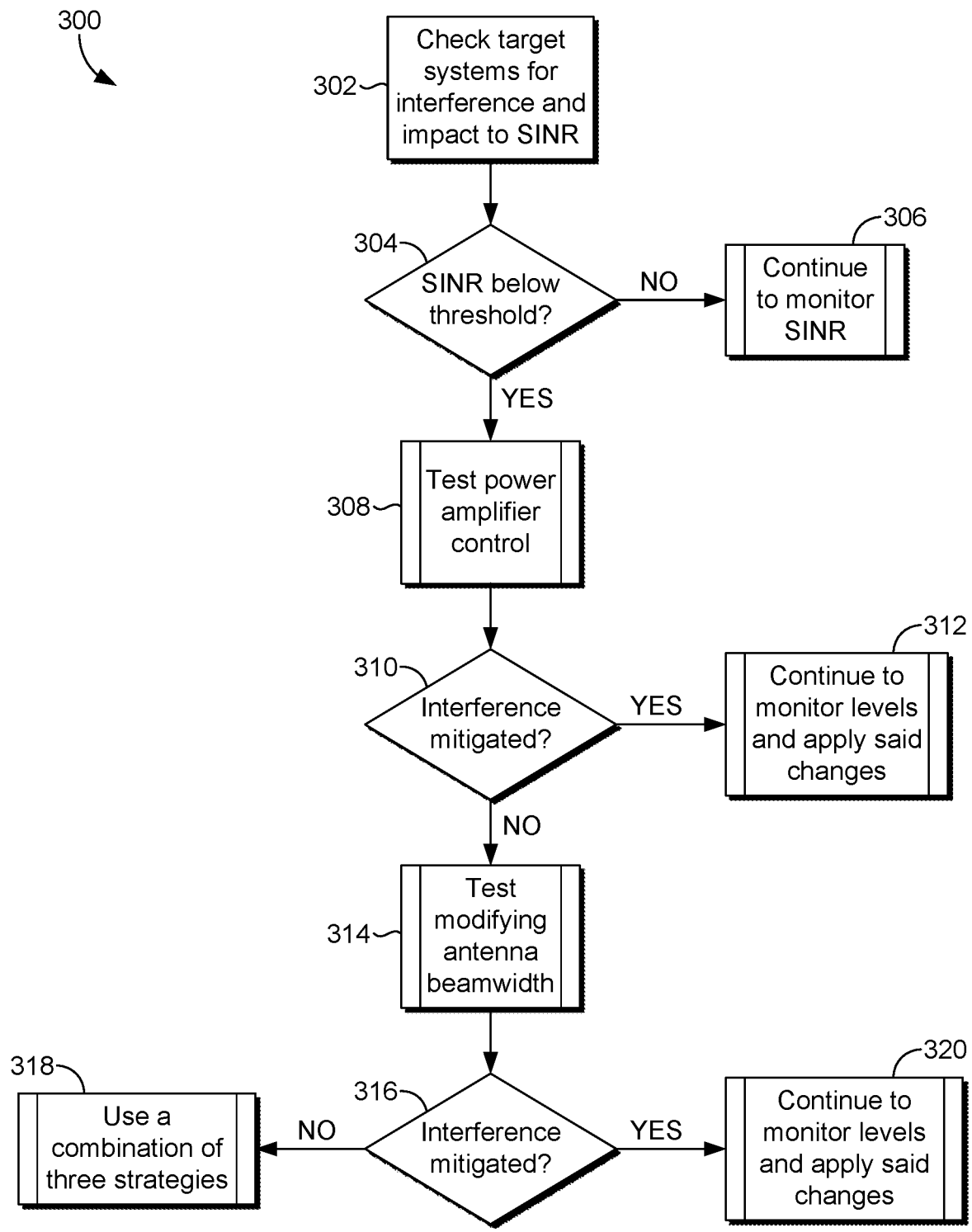
FIG. 3 is a flow diagram showing an example method of reducing massive multiple-input multiple-output interference with an adjacent band, in accordance with some aspects of the technology described herein.

Referring to FIG. 3, a flow diagram is provided showing a method 300 of reducing mMIMO/5G interference with an adjacent band according to the technology described herein. Although the steps are illustrated as being performed by the MMU in a particular order, it is contemplated that the mitigation controls may be tested and applied in any order or in combination with each other. At step 302, targets are monitored for interference and more specifically, an impact to the SINR. If the SINR is not below a particular threshold, at step 304, the SINR continues to be monitored, at step 306.

If, on the other hand, the SINR is below a particular threshold, at step 304, the MMU determines if a power amplifier control should be applied, at step 308. For example, the power amplifier control may alternate the output power control range of the antenna by reducing the one or more elements to a level necessary to avoid interference (e.g., OOBE) with respect to the target. Alternatively, the power amplifier control may switch off boresight power controls to reduce the overall EIRP, which effectively turns of the dipoles for that particular radiation.

The SINR is again checked, at step 310, to determine if the interference will be mitigated by applying the power amplifier control. If the interference will be mitigated, the SINR continues to be monitored, at step 312, and the power amplifier control is applied.

If the interference will not be mitigated, the MMU determines, at step 314, if modifying the beamwidth of the antenna should be applied. If the interference will be mitigated, the SINR continues to be monitored, at step 320, and the beamwidth of the antenna is modified.

Alternatively, if the interference will not be mitigated, the MMU determines, at step 318, a combination of the three mitigation controls to apply that will increase the SINR to an acceptable level.

Figure 4:
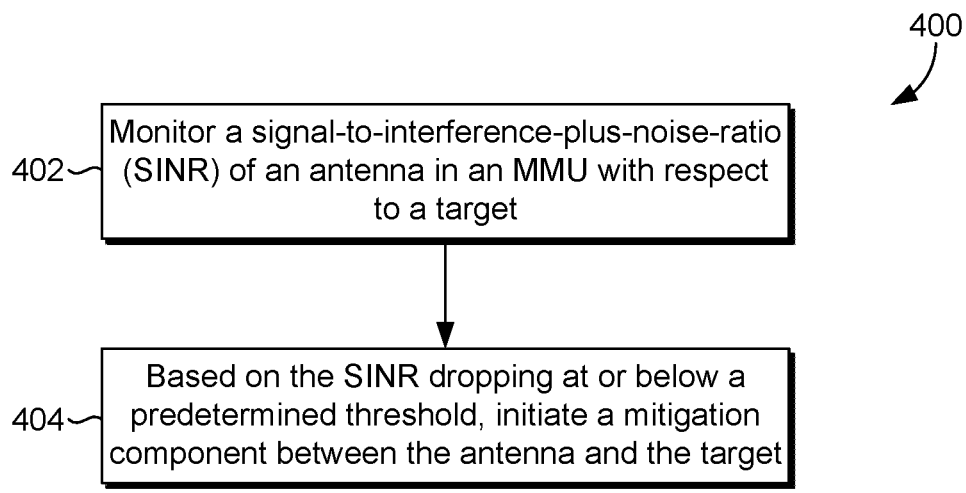
FIG. 4 is a flow diagram of an example method for initiating a mitigation component upon detecting massive multiple-input multiple-output interference with an adjacent band, in accordance with some aspects of the technology described herein.

Referring to FIG. 4, a flow diagram is provided depicting a method for initiating a mitigation component upon detecting mMIMO/5G interference with an adjacent band, according to aspects of the technology described herein. Initially, at step 402, a signal-to-interference-plus-noise-ratio (SINR) of an antenna in an MMU is monitored with respect to a target. In various embodiments, the target is operating in a NEXRAD spectrum, an airport spectrum, or a military spectrum. Based on the SINR dropping below a predetermined threshold, at step 404, a mitigation component is initiated between the antenna and the target. Additionally, the MMU tracks changes over time and signals the target to provide SINR information.

Figure 5:
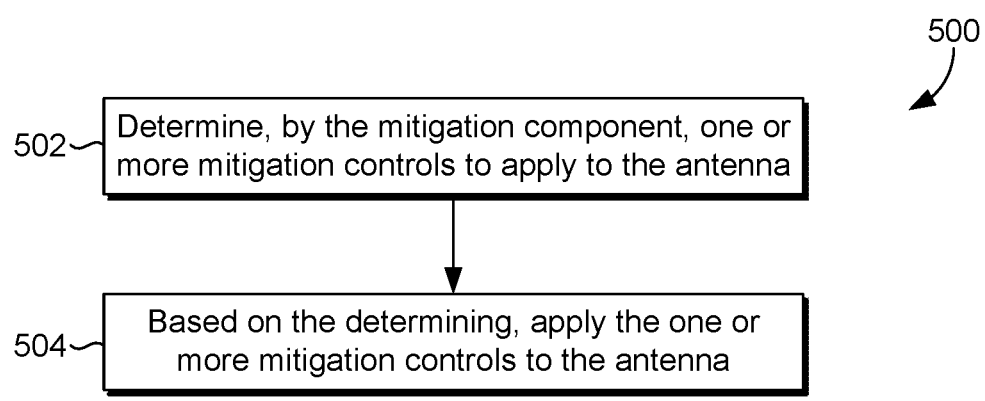
FIG. 5 is a flow diagram of an example method for applying one or mitigation controls to an antenna to reduce massive multiple-input multiple-output interference with an adjacent band, in accordance with some aspects of the technology described herein.

Referring to FIG. 5, a flow diagram is provided depicting a method for applying one or mitigation controls to an antenna to reduce mMIMO/5G interference with an adjacent band, according to aspects of the technology described herein. At step 502, the mitigation component determines one or more mitigation controls to apply to the antenna. To do so, an EIRP of the antenna is calculated for each of the one or more mitigation controls or a combination of the one or more mitigation controls to determine which of the one or more mitigation controls will increase the SINR to a level at or above the predetermine threshold. A base station of the MMU may utilize a topographic map of an area corresponding to the MMU as an input to determining the EIRP. Additionally or alternatively, a location of protected sites may be loaded in to LSM with azimuth and height info of the target via a lookup table as an input to determining the EIRP.

Based on the determining, the one or more mitigation controls are applied, at step 504, to the antenna. In various embodiments, the one or more mitigation controls may include one or more of alternating an output power control range of the antenna, turning off a physical dipole of the antenna, or modifying a beamwidth of the antenna.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 6:
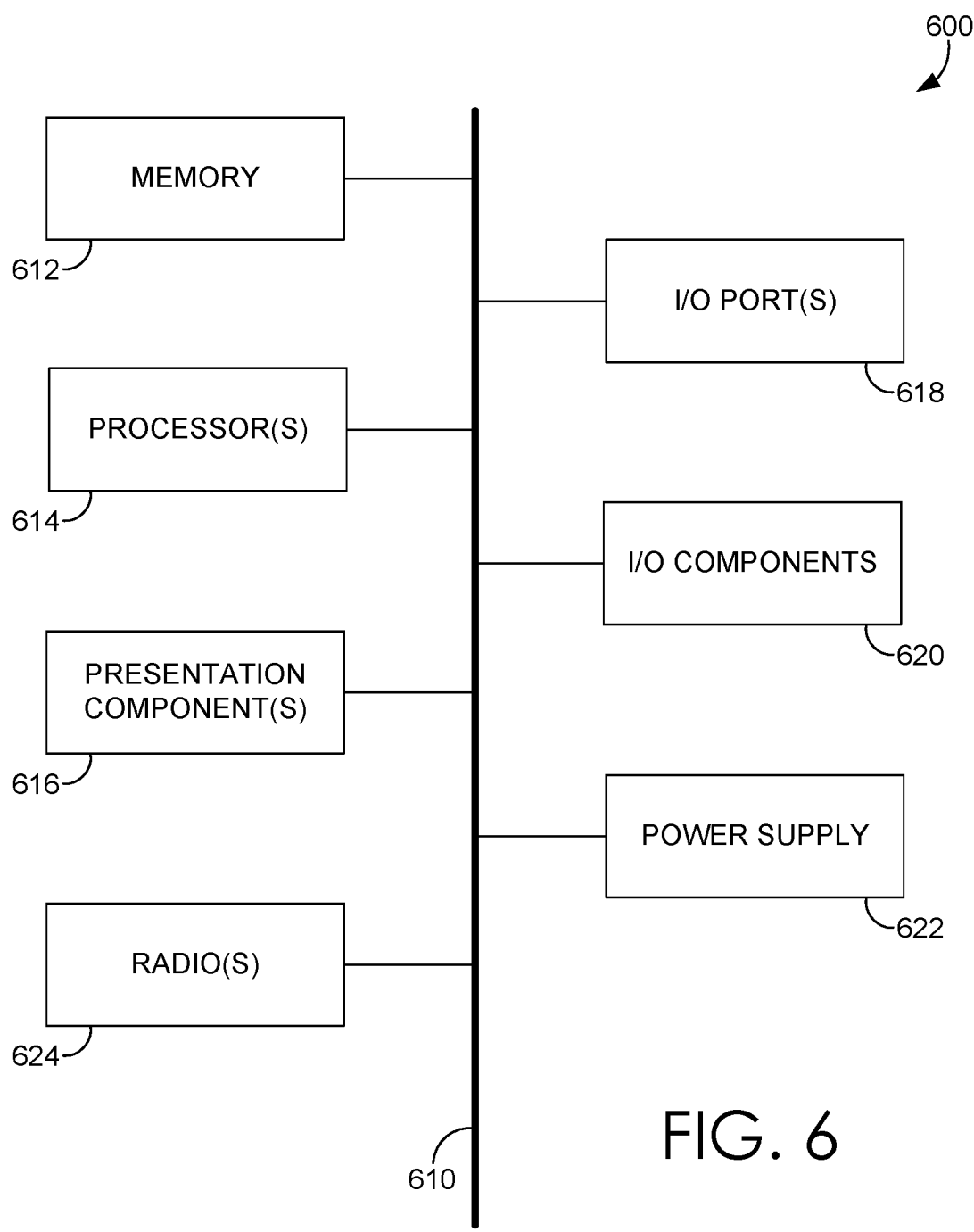
FIG. 6 depicts an example computing environment suitable for use in implementation of the present disclosure.

Referring to FIG. 6, a block diagram of an exemplary computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. It should be noted that although some components in FIG. 6 are shown in the singular, they may be plural. For example, the computing device 600 might include multiple processors or multiple radios. In aspects, the computing device 600 may be a UE/WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 610 that directly or indirectly couples various components together, including memory 612, processor(s) 614, presentation component(s) 616 (if applicable), radio(s) 624, input/output (I/O) port(s) 618, input/output (I/O) component(s) 620, and power supply(s) 622. Although the components of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 612 may take the form of memory components described herein. Thus, further elaboration will not be provided here, but it should be noted that memory 612 may include any type of tangible medium that is capable of storing information, such as a database. A database may be any collection of records, data, and/or information. In one embodiment, memory 612 may include a set of embodied computer-executable instructions that, when executed, facilitate various functions or elements disclosed herein. These embodied instructions will variously be referred to as "instructions" or an "application" for short.

Processor 614 may actually be multiple processors that receive instructions and process them accordingly. Presentation component 616 may include a display, a speaker, and/or other components that may present information (e.g., a display, a screen, a lamp (LED), a graphical user interface (GUI), and/or even lighted keyboards) through visual, auditory, and/or other tactile cues.

Radio 624 represents a radio that facilitates communication with a wireless telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 618 may take a variety of forms. Exemplary I/O ports may include a USB jack, a stereo jack, an infrared port, a firewire port, other proprietary communications ports, and the like. Input/output (I/O) components 620 may comprise keyboards, microphones, speakers, touchscreens, and/or any other item usable to directly or indirectly input data into the computing device 600.

Power supply 622 may include batteries, fuel cells, and/or any other component that may act as a power source to supply power to the computing device 600 or to other network components, including through one or more electrical connections or couplings. Power supply 622 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for reducing massive multiple-input multiple-output (mMIMO)/5G interference with an adjacent band, the method comprising:
monitoring a signal-to-interference-plus-noise-ratio (SINR) of an antenna in a mMIMO unit (MMU) with respect to a target;
based on the SINR dropping below a predetermined threshold, initiating a mitigation component between the antenna and the target; and
determining, by the mitigation component, one or more mitigation controls to apply to the antenna.

2. The method of claim 1, further comprising, based on the determining, applying the one or more mitigation controls to the antenna.

3. The method of claim 2, wherein one of the one or more mitigation controls comprises alternating an output power control range of the antenna.

4. The method of claim 2, wherein one of the one or more mitigation controls comprises turning off a physical dipole of the antenna.

5. The method of claim 2, wherein one of the one or more mitigation controls comprises modifying a beam width of the antenna.

6. The method of claim 2, further comprising monitoring the SINR of the antenna in the MMU with respect to the target to determine if the SINR has returned to a level at or above the predetermined threshold.

7. The method of claim 2, wherein the determining, by the mitigation component, the one or more mitigation controls to apply to the antenna comprises calculating an Equivalent Isotropically Radiated Power (EIRP) of the MMU for each of the one or more mitigation controls or a combination of the one or more mitigation controls.

8. The method of claim 7, wherein a base station of the MMU utilizes a topographic map of an area corresponding to the MMU as an input to the determining by the mitigation component.

9. The method of claim 1, wherein the target is operating in a Next-Generation Radar (NEXRAD) spectrum.

10. The method of claim 1, wherein the target is operating in an airport spectrum.

11. The method of claim 1, wherein the target is operating in a military spectrum.

12. The method of claim 1, wherein the MMU tracks changes over time and signals the target to provide SINR information.

13. One or more non-transitory computer-readable media having computer-executable instructions embodied thereon that, when executed by at least one computing device, cause the computing device to perform operations for reducing massive multiple-input multiple-output (mMIMO)/5G interference with an adjacent band, the operations comprising:
monitoring a signal-to-interference-plus-noise-ratio (SINR) of an antenna in a mMIMO unit (MMU) with respect to a target;
based on the SINR dropping below a predetermined threshold, initiating a mitigation component between the antenna and the target;
determining, by the mitigation component, one or more mitigation controls to apply to the antenna; and
based on the determining, applying the one or more mitigation controls to the antenna.

14. The one or more computer-readable media of claim 13, wherein the one or more mitigation controls comprises one or more of: alternating an output power control range of the antenna, turning off a physical dipole of the antenna, modifying a beam width of the antenna.

15. The one or more computer-readable media of claim 13, further comprising monitoring the SINR of the antenna in the MMU with respect to the target to determine if the SINR has returned to a level at or above the predetermined threshold.

16. The one or more computer-readable media of claim 13, wherein the determining, by the mitigation component, the one or more mitigation controls to apply to the antenna comprises calculating an EIRP of the antenna for each of the one or more mitigation controls or a combination of the one or more mitigation controls.

17. The one or more computer-readable media of claim 13, wherein a location of protected sites are loaded in to LSM with azimuth and height info of the target via a lookup table.

18. The one or more computer-readable media of claim 13, wherein a base station of the MMU utilizes a topographic map of an area corresponding to the MMU as an input to the determining by the mitigation component.

19. A system for reducing massive multiple-input multiple-output (mMIMO)/5G interference with an adjacent band, the system comprising:
- a mMIMO unit (MMU) comprising a plurality of antennas that monitors a signal-to-interference-plus-noise-ratio (SINR) of an antenna of the plurality of antennas with respect to a target; and
- a mitigation component that, based on the SINR dropping below a predetermined threshold, is applied between the antenna and the target to determine one or more mitigation controls to apply to the antenna, wherein, based on the determining, the MMU applies the one or more mitigation controls to the antenna, the one or more mitigation controls comprising one or more of: alternating an output power control range of the antenna, turning off a physical dipole of the antenna, modifying a beam width of the antenna.

\* \* \* \* \*